US00RE46427E

(19) United States
(12) Reissued Patent
Angst et al.

(10) Patent Number: US RE46,427 E
(45) Date of Reissued Patent: Jun. 6, 2017

(54) ANTIOXIDANTS FOR POST-CMP CLEANING FORMULATIONS

(71) Applicant: ADVANCED TECHNOLOGY MATERIALS, INC., Danbury, CT (US)

(72) Inventors: David Angst, New Tripoli, PA (US); Peng Zhang, Montvale, NJ (US); Jeffrey Barnes, Bethlehem, CT (US); Prerna Sonthalia, Mumbai (IN); Emanuel Cooper, Scarsdale, NY (US); Karl Boggs, Hopewell Junction, NY (US)

(73) Assignee: Entegris, Inc., Billerica, MA (US)

(21) Appl. No.: 14/595,758

(22) Filed: Jan. 13, 2015

Related U.S. Patent Documents

Reissue of:
(64) Patent No.: 8,685,909
Issued: Apr. 1, 2014
Appl. No.: 12/409,267
Filed: Mar. 23, 2009

U.S. Applications:
(63) Continuation-in-part of application No. PCT/US2007/079044, filed on Sep. 20, 2007, and a continuation-in-part of application No. PCT/US2008/063885, filed on May 16, 2008.

(60) Provisional application No. 60/846,306, filed on Sep. 21, 2006, provisional application No. 60/938,591, filed on May 17, 2007.

(51) Int. Cl.
*C11D 7/50* (2006.01)
*C11D 11/00* (2006.01)
*C11D 3/00* (2006.01)
*C11D 7/32* (2006.01)

(52) U.S. Cl.
CPC ..... *C11D 3/0073* (2013.01); *C11D 3/0084* (2013.01); *C11D 7/32* (2013.01); *C11D 11/0047* (2013.01)

(58) Field of Classification Search
None
See application file for complete search history.

(56) References Cited

U.S. PATENT DOCUMENTS 5,174,816 A 12/1992 Aoyama et al.
5,308,745 A 5/1994 Schwartzkopf
5,466,297 A 11/1995 Goodman et al.
5,466,389 A 11/1995 Ilardi et al.
5,489,557 A 2/1996 Jolley
5,498,293 A 3/1996 Ilardi et al.
5,563,119 A 10/1996 Ward
5,567,574 A 10/1996 Hasemi et al.
5,571,447 A 11/1996 Ward et al.
5,597,420 A 1/1997 Ward
5,612,304 A 3/1997 Honda et al.
5,855,811 A 1/1999 Grieger et al.
5,863,344 A * 1/1999 Nam ..... H01L 21/02063 134/1.3
5,962,384 A 10/1999 Cooper et al.
5,981,454 A 11/1999 Small
5,988,186 A 11/1999 Ward et al.
5,989,353 A 11/1999 Skee et al.
5,997,658 A 12/1999 Peters et al.
6,030,932 A 2/2000 Leon et al.
6,143,705 A 11/2000 Kakizawa et al.
6,156,661 A 12/2000 Small
6,194,366 B1 2/2001 Naghshineh et al.
6,228,823 B1 5/2001 Morinaga et al.
6,395,693 B1 5/2002 Wang
6,410,494 B2 6/2002 Kakizawa et al.
6,413,923 B2 7/2002 Honda et al.
6,440,326 B1 8/2002 Maruyama et al.
6,492,308 B1 12/2002 Naghshineh et al.
6,514,434 B1 2/2003 He et al.
6,514,921 B1 2/2003 Kakizawa et al.
6,541,434 B2 4/2003 Wang
6,585,825 B1 * 7/2003 Skee ..... 134/3
6,599,370 B2 * 7/2003 Skee ..... 134/3
6,627,587 B2 9/2003 Naghshineh et al.
6,646,082 B2 11/2003 Ghosh et al.
(Continued)

FOREIGN PATENT DOCUMENTS

EP 0647884 A1 4/1995
EP 0773480 A1 5/1997
(Continued)

OTHER PUBLICATIONS

Xiang-Bin, Chang, et al.; "A Comparatice Study on the Anodic Behaviour of Adenine, Adenosine, and 5'-AMP at Carbon Paste Electrode," Acta Chimica Sinica, 1989, English Abstract is on Last Page.
Chinese Office Action Mar. 2, 2015.
European Office Action dated Jul. 7, 2014.
Japanese Office Action dated Jun. 23, 2014.
Korean Office Action dated May 26, 2014.
Wantanabe, Hidemitsu Aoki Daisuke, et al.; "Corrosion Suppression during Wet Processes in FEOL and BEOL for 45nm Node and beyond," ECS Transactions, The Electrochemical Society, 2007, pp. 19-30, vol. 11.
(Continued)

*Primary Examiner* — Ling Xu
(74) *Attorney, Agent, or Firm* — Entegris, Inc. Legal Dept.; Nidhi G. Kissoon

(57) ABSTRACT

An cleaning composition and process for cleaning post-chemical mechanical polishing (CMP) residue and contaminants from a microelectronic device having said residue and contaminants thereon. The cleaning compositions include novel corrosion inhibitors. The composition achieves highly efficacious cleaning of the post-CMP residue and contaminant material from the surface of the microelectronic device without compromising the low-k dielectric material or the copper interconnect material.

8 Claims, 2 Drawing Sheets

(56) References Cited

U.S. PATENT DOCUMENTS

| | | | | |
|---|---|---|---|---|
| 6,723,691 | B2 | 4/2004 | Naghshineh et al. | |
| 6,749,998 | B2 | 6/2004 | Schwartzkopf et al. | |
| 6,786,945 | B2 | 9/2004 | Machii et al. | |
| 6,787,480 | B2 | 9/2004 | Aoki et al. | |
| 6,869,921 | B2 | 3/2005 | Koito et al. | |
| 6,982,188 | B1 | 1/2006 | Xie et al. | |
| 6,992,050 | B2 * | 1/2006 | Koita et al. | 510/176 |
| 7,087,564 | B2 | 8/2006 | Misra et al. | |
| 7,118,685 | B1 | 10/2006 | Yoneda et al. | |
| 7,160,432 | B2 | 1/2007 | Liu et al. | |
| 7,235,188 | B2 | 6/2007 | Daviot et al. | |
| 7,250,391 | B2 | 7/2007 | Kanno et al. | |
| 7,365,045 | B2 | 4/2008 | Walker et al. | |
| 7,375,066 | B2 | 5/2008 | Kakizawa et al. | |
| 7,396,806 | B2 | 7/2008 | Sakai et al. | |
| 7,476,620 | B2 | 1/2009 | Siddiqui et al. | |
| 7,498,295 | B2 * | 3/2009 | Fisher et al. | 510/175 |
| 7,563,754 | B2 * | 7/2009 | Oowada et al. | 510/175 |
| 7,671,001 | B2 * | 3/2010 | Skee | 510/175 |
| 7,723,280 | B2 | 5/2010 | Brainard et al. | |
| 8,685,909 | B2 | 4/2014 | Angst et al. | |
| 8,759,268 | B2 | 6/2014 | Nakamura | |
| 9,063,431 | B2 | 6/2015 | Barnes et al. | |
| 9,074,170 | B2 | 7/2015 | Barnes et al. | |
| 2001/0004633 | A1 | 6/2001 | Naghshineh et al. | |
| 2002/0077259 | A1 | 6/2002 | Skee et al. | |
| 2003/0096500 | A1 | 5/2003 | Kneer | |
| 2003/0158059 | A1 | 8/2003 | Sakai et al. | |
| 2004/0029051 | A1 * | 2/2004 | Koita et al. | 430/313 |
| 2004/0180300 | A1 | 9/2004 | Minsek et al. | |
| 2004/0220065 | A1 | 11/2004 | Hsu | |
| 2005/0112892 | A1 | 5/2005 | Chen et al. | |
| 2005/0126588 | A1 * | 6/2005 | Carter et al. | 134/3 |
| 2005/0181961 | A1 * | 8/2005 | Misra et al. | 510/175 |
| 2005/0183740 | A1 * | 8/2005 | Fulton et al. | 134/3 |
| 2005/0197265 | A1 | 9/2005 | Rath et al. | |
| 2005/0205835 | A1 | 9/2005 | Tamboli et al. | |
| 2005/0206005 | A1 | 9/2005 | Buehler | |
| 2005/0284844 | A1 | 12/2005 | Hattori | |
| 2005/0288199 | A1 * | 12/2005 | Oowada et al. | 510/175 |
| 2006/0016785 | A1 | 1/2006 | Egbe et al. | |
| 2006/0019201 | A1 | 1/2006 | Muramatsu | |
| 2006/0073997 | A1 | 4/2006 | Leonte et al. | |
| 2006/0148666 | A1 | 7/2006 | Peters et al. | |
| 2006/0166847 | A1 | 7/2006 | Walker et al. | |
| 2007/0060490 | A1 * | 3/2007 | Skee | 510/175 |
| 2008/0004197 | A1 | 1/2008 | Kneer | |
| 2008/0047592 | A1 * | 2/2008 | Fisher et al. | 134/41 |
| 2008/0076688 | A1 | 3/2008 | Barnes et al. | |
| 2009/0032766 | A1 * | 2/2009 | Rajaratnam et al. | 252/79.1 |
| 2009/0118153 | A1 * | 5/2009 | Rath et al. | 510/176 |
| 2009/0301996 | A1 * | 12/2009 | Visintin et al. | 216/13 |
| 2010/0056409 | A1 * | 3/2010 | Walker et al. | 510/175 |
| 2010/0286014 | A1 * | 11/2010 | Barnes | 510/175 |

FOREIGN PATENT DOCUMENTS

| | | | |
|---|---|---|---|
| EP | 1263300 | A | 12/2002 |
| JP | 63274149 | A | 11/1988 |
| JP | 07201794 | A | 8/1995 |
| JP | H07-219241 | | 8/1995 |
| JP | 07247498 | A | 9/1995 |
| JP | 08202052 | A | 8/1996 |
| JP | 11271985 | A | 8/1999 |
| JP | 200198258 | A | 4/2001 |
| JP | 2002097584 | A | 4/2002 |
| JP | 2002099101 | A | 4/2002 |
| JP | 2003292117 | A | 10/2003 |
| JP | 2003536258 | A | 12/2003 |
| JP | 2005043873 | A | 2/2005 |
| TW | I454574 | B | 10/2014 |
| WO | 9408276 | A1 | 4/1994 |
| WO | 9816330 | A1 | 4/1998 |
| WO | 9960448 | A1 | 11/1999 |
| WO | 0160179 | A1 | 8/2001 |
| WO | 0195381 | A2 | 12/2001 |
| WO | 0197268 | A1 | 12/2001 |
| WO | 2006127885 | A1 | 11/2006 |
| WO | 2007092800 | A2 | 8/2007 |
| WO | 2008023754 | A1 | 2/2008 |
| WO | 2008039730 | A1 | 4/2008 |

OTHER PUBLICATIONS

Korean Office Action dated Nov. 19, 2014.
U.S. Appl. No. 60/938,591, filed May 17, 2007.
English Translation of Taiwanese Statement of Reasons for Patent Invalidation, Feb. 18, 2015.
Taiwanese Office Action, Dec. 16, 2015.
U.S. Office Action, Sep. 29, 2015 for U.S. Appl. No. 14/224,672.
Japanese Office action dated Mar. 7, 2013.
International Bureau of WIPO, International Preliminary Report on Patentability, dated Nov. 17, 2009.
International Bureau of WIPO, International Search Report, dated Jan. 16, 2009.

* cited by examiner

ANTIOXIDANTS FOR POST-CMP CLEANING FORMULATIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation-in-part of PCT Application No. PCT/US07/79044, filed Sep. 20, 2007 in the name of David Angst et al., which claims priority to U.S. Provisional Patent Application No. 60/846,306, filed on Sep. 21, 2006 in the name of David Angst, and this application is also a continuation-in-part of PCT Application No. PCT/US08/63885, filed May 16, 2008 in the name of Peng Zhang et al., which claims priority to U.S. Provisional Patent Application No. 60/938,591, filed on May 17, 2007 in the name of Peng Zhang et al., all of which are incorporated by reference in their respective entirety herein.

FIELD

The present invention relates generally to compositions including antioxidants for cleaning residue and/or contaminants from microelectronic devices having same thereon.

DESCRIPTION OF THE RELATED ART

Microelectronic device wafers are used to form integrated circuits. The microelectronic device wafer includes a substrate, such as silicon, into which regions are patterned for deposition of different materials having insulative, conductive or semi-conductive properties.

In order to obtain the correct patterning, excess material used in forming the layers on the substrate must be removed. Further, to fabricate functional and reliable circuitry, it is important to prepare a flat or planar microelectronic wafer surface prior to subsequent processing. Thus, it is necessary to remove and/or polish certain surfaces of a microelectronic device wafer.

Chemical Mechanical Polishing or Planarization ("CMP") is a process in which material is removed from a surface of a microelectronic device wafer, and the surface is polished (more specifically, planarized) by coupling a physical process such as abrasion with a chemical process such as oxidation or chelation. In its most rudimentary form, CMP involves applying slurry, e.g., a solution of an abrasive and an active chemistry, to a polishing pad that buffs the surface of a microelectronic device wafer to achieve the removal, planarization, and polishing processes. It is not desirable for the removal or polishing process to be comprised of purely physical or purely chemical action, but rather the synergistic combination of both in order to achieve fast, uniform removal. In the fabrication of integrated circuits, the CMP slurry should also be able to preferentially remove films that comprise complex layers of metals and other materials so that highly planar surfaces can be produced for subsequent photolithography, or patterning, etching and thin-film processing.

Recently, copper has been increasingly used for metal interconnects in integrated circuits. In copper damascene processes commonly used for metallization of circuitry in microelectronic device fabrication, the layers that must be removed and planarized include copper layers having a thickness of about 1-1.5 μm and copper seed layers having a thickness of about 0.05-0.15 μm. These copper layers are separated from the dielectric material surface by a layer of barrier material, typically about 50-300 Å thick, which prevents diffusion of copper into the oxide dielectric material. One key to obtaining good uniformity across the wafer surface after polishing is to use a CMP slurry that has the correct removal selectivities for each material.

The foregoing processing operations, involving wafer substrate surface preparation, deposition, plating, etching and chemical mechanical polishing, variously require cleaning operations to ensure that the microelectronic device product is free of contaminants that would otherwise deleteriously affect the function of the product, or even render it useless for its intended function. Often, particles of these contaminants are smaller than 0.3 μm.

One particular issue in this respect is the residues that are left on the microelectronic device substrate following CMP processing. Such residues include CMP material and corrosion inhibitor compounds such as benzotriazole (BTA). If not removed, these residues can cause damage to copper lines or severely roughen the copper metallization, as well as cause poor adhesion of post-CMP applied layers on the device substrate. Severe roughening of copper metallization is particularly problematic, since overly rough copper can cause poor electrical performance of the product microelectronic device.

Another residue-producing process common to microelectronic device manufacturing involves gas-phase plasma etching to transfer the patterns of developed photoresist coatings to the underlying layers, which may consist of hardmask, interlevel dielectric (ILD), and etch stop layers. Post-gas phase plasma etch residues, which may include chemical elements present on the substrate and in the plasma gases, are typically deposited on the back end of the line (BEOL) structures and if not removed, may interfere with subsequent silicidation or contact formation. Conventional cleaning chemistries often damage the ILD, absorb into the pores of the ILD thereby increasing the dielectric constant, and/or corrode the metal structures.

The microelectronics industry therefore continues to seek improvement in cleaning formulations for copper-metallized substrates, and in compositions for processing of microelectronic device structures, including compositions variously useful for post-etching cleaning, post-ashing cleaning and post-chemical mechanical polishing cleaning of microelectronic device wafers.

SUMMARY

The present invention generally relates to a composition and process for cleaning residue and/or contaminants from microelectronic devices having said residue and contaminants thereon. The cleaning compositions described herein include at least one novel antioxidant as a corrosion inhibitor. The residue may include post-CMP, post-etch, or post-ash residue.

In one aspect, a cleaning composition comprising at least one solvent, at least one corrosion inhibitor, and at least one amine is described, wherein the corrosion inhibitor comprises a species selected from the group consisting of: cyanuric acid; barbituric acid and derivatives thereof; glucuronic acid; squaric acid; alpha-keto acids; adenosine and derivatives thereof; purine compounds and derivatives thereof; phosphonic acid derivatives; phenanthroline/ascorbic acid; glycine/ascorbic acid; nicotinamide and derivatives thereof; flavonols and derivatives thereof; anthocyanins and derivatives thereof; flavonol/anthocyanin; and combinations thereof, wherein the cleaning composition is effective for the removal of residue from a microelectronic device having said residue thereon. The cleaning composition may further comprise at least one additional component selected from the group consisting of: at least one quaternary base; at least one complexing agent; at least one surfactant; at least one reducing agent; at least one dispersing agent; at least one sulfonic acid-containing hydrocarbon; uric acid; at least one alcohol; and combinations thereof.

In another aspect, a cleaning composition comprising at least one solvent, at least one surfactant, at least one dispersing agent, at least one sulfonic-acid containing hydrocarbon, and at least one corrosion inhibitor is described, wherein the corrosion inhibitor comprises a species selected from the group consisting of: cyanuric acid; barbituric acid and derivatives thereof; glucuronic acid; squaric acid; alpha-keto acids; adenosine and derivatives thereof; purine compounds and derivatives thereof; phosphonic acid derivatives; phenanthroline/ascorbic acid; glycine/ascorbic acid; nicotinamide and derivatives thereof; flavonols and derivatives thereof; anthocyanins and derivatives thereof; flavonol/anthocyanin; and combinations thereof, wherein the cleaning composition is effective for the removal of residue from a microelectronic device having said residue thereon.

In yet another aspect, the invention relates to removal composition comprising at least one amine, at least one quaternary base, at least one antioxidant, optionally at least one alcohol and optionally at least one additional corrosion inhibitor, wherein said removal composition is suitable for removing residue and contaminants from a microelectronic device having said material thereon.

Yet another aspect relates to a removal composition comprising at least one amine, at least one quaternary base, at least one antioxidant, at least one alcohol and at least one additional organic acid antioxidant, wherein said removal composition is suitable for removing residue and contaminants from a microelectronic device having said material thereon. Preferably, the at least one antioxidant comprises uric acid.

In another aspect, a kit is described, said kit comprising, in one or more containers, one or more of the following reagents for forming a cleaning composition, said one or more reagents selected from the group consisting of: at least one corrosion inhibitor; at least one quaternary base; at least one organic amine; at least one complexing agent; at least one surfactant; at least one reducing agent; at least one dispersing agent; at least one sulfonic acid-containing hydrocarbon; at least one amine; uric acid; at least one alcohol; and combinations thereof. The at least one corrosion inhibitor preferably comprises at least one species selected from the group consisting of squaric acid, adenosine and derivatives thereof, phenanthroline/ascorbic acid, nicotinamide and derivatives thereof, flavonoids, anthocyanins, flavonol/anthocyanins, quercitin and derivatives thereof, glucuronic acid, quercitin/anthocyanins, and combinations thereof.

In yet another aspect, a method of removing residue and contaminants from a microelectronic device having said residue and contaminants thereon is described, said method comprising contacting the microelectronic device with a cleaning composition for sufficient time to at least partially clean said residue and contaminants from the microelectronic device, wherein the cleaning composition includes at least one solvent, at least one corrosion inhibitor and at least one amine, wherein the corrosion inhibitor comprises a species selected from the group consisting of consisting of: cyanuric acid; barbituric acid and derivatives thereof; glucuronic acid; squaric acid; alpha-keto acids; adenosine and derivatives thereof; purine compounds and derivatives thereof; phosphonic acid derivatives; phenanthroline/ascorbic acid; glycine/ascorbic acid; nicotinamide and derivatives thereof; flavonols and derivatives thereof; anthocyanins and derivatives thereof; flavonol/anthocyanin; and combinations thereof. The cleaning composition may further comprise at least one additional component selected from the group consisting of: at least one quaternary base; at least one complexing agent; at least one surfactant; at least one reducing agent; at least one dispersing agent; at least one sulfonic acid-containing hydrocarbon; uric acid; at least one alcohol; and combinations thereof.

Another aspect relates to a method of identifying an endpoint of a cleaning composition, said method comprising:

contacting a microelectronic device having residue thereon with a cleaning composition, wherein the cleaning composition includes at least one antioxidant (i.e., corrosion inhibitor), wherein the antioxidant is in a first state, signifying that the cleaning composition is useful to substantially remove said residue from the microelectronic device; and monitoring the cleaning composition, wherein a transition of the antioxidant to a second state signifies an endpoint of the cleaning composition, wherein the first state of the antioxidant may be colorless or a first color in the visible spectrum, the second state of the of the antioxidant may be colorless or a second color in the visible spectrum, and the first state and the second state are not the same.

In another aspect, a method of removing post-CMP residue and contaminants from a microelectronic device having same thereon is described, said method comprising:

polishing the microelectronic device with a CMP slurry;

contacting the microelectronic device with a cleaning composition comprising at least one corrosion inhibitor, for a sufficient time to remove post-CMP residue and contaminants from the microelectronic device to form a post-CMP residue-containing composition; and continuously contacting the microelectronic device with the post-CMP residue-containing composition for a sufficient amount of time to effect substantial cleaning of the microelectronic device, wherein the at least one corrosion inhibitor comprises a species selected from the group consisting of consisting of: cyanuric acid; barbituric acid and derivatives thereof; glucuronic acid; squaric acid; alpha-keto acids; adenosine and derivatives thereof; purine compounds and derivatives thereof; phosphonic acid derivatives; phenanthroline/ascorbic acid; glycine/ascorbic acid; nicotinamide and derivatives thereof; flavonols and derivatives thereof; anthocyanins and derivatives thereof; flavonol/anthocyanin; and combinations thereof.

In a further aspect, a method of manufacturing a microelectronic device is described, said method comprising contacting the microelectronic device with a cleaning composition described herein for sufficient time to at least partially clean post-CMP residue, post-etch residue, post-ash residue and/or contaminants from the microelectronic device having said residue and contaminants thereon.

Yet another aspect relates to improved microelectronic devices, and products incorporating same, made using the methods described herein comprising cleaning of post-CMP residue, post-etch residue, post-ash residue and/or contaminants from the microelectronic device having said residue and contaminants thereon, using the methods and/or compositions described herein, and optionally, incorporating the microelectronic device into a product.

Another aspect relates to an article of manufacture comprising a cleaning composition, a microelectronic device wafer, and material selected from the group consisting of residue, contaminants and combinations thereof, wherein the cleaning composition comprises at least one solvent, at least one corrosion inhibitor and at least one amine, wherein the at least one corrosion inhibitor comprises a species selected from the group consisting of cyanuric acid; barbituric acid and derivatives thereof; glucuronic acid; squaric acid; alpha-keto acids; adenosine and derivatives thereof; purine compounds and derivatives thereof; phosphonic acid derivatives; phenanthroline/ascorbic acid; glycine/ascorbic acid; nicotinamide and derivatives thereof; flavonols and derivatives thereof; anthocyanins and derivatives thereof; flavonol/anthocyanin; and combinations thereof, and wherein the residue comprises at least one of post-CMP residue, post-etch residue and post-ash residue.

Other aspects, features and advantages of the invention will be more fully apparent from the ensuing disclosure and appended claims.

DETAILED DESCRIPTION AND PREFERRED EMBODIMENTS THEREOF

Figure 1A:
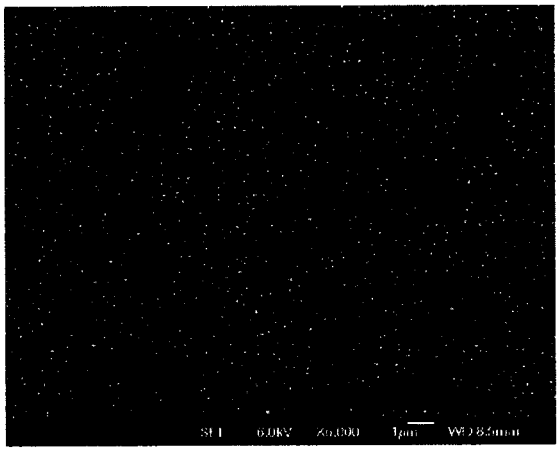
FIG. 1a is a scanning electron micrograph (SEM) of the control wafer (post-CMP) at 6,000 times magnification; showing residues from the CMP process and slurry particles.

The present invention relates generally to compositions useful for the removal of residue and contaminants from a microelectronic device having such material(s) thereon. The compositions are particularly useful for the removal of post-CMP, post-etch or post-ash residue.

For ease of reference, "microelectronic device" corresponds to semiconductor substrates, flat panel displays, phase change memory devices, solar panels and other products including solar substrates, photovoltaics, and microelectromechanical systems (MEMS), manufactured for use in microelectronic, integrated circuit, or computer chip applications. Solar substrates include, but are not limited to, silicon, amorphous silicon, polycrystalline silicon, monocrystalline silicon, CdTe, copper indium selenide, copper indium sulfide, and gallium arsenide on gallium. The solar substrates may be doped or undoped. It is to be understood that the term "microelectronic device" is not meant to be limiting in any way and includes any substrate that will eventually become a microelectronic device or microelectronic assembly.

As used herein, "residue" corresponds to particles generated during the manufacture of a microelectronic device including, but not limited to, plasma etching, ashing, chemical mechanical polishing, wet etching, and combinations thereof.

As used herein, "contaminants" correspond to chemicals present in the CMP slurry, reaction by-products of the polishing slurry, chemicals present in the wet etching composition, reaction by products of the wet etching composition, and any other materials that are the by-products of the CMP process, the wet etching, the plasma etching or the plasma ashing process.

As used herein, "post-CMP residue" corresponds to particles from the polishing slurry, e.g., silica-containing particles, chemicals present in the slurry, reaction by-products of the polishing slurry, carbon-rich particles, polishing pad particles, brush deloading particles, equipment materials of construction particles, copper, copper oxides, organic residues, and any other materials that are the by-products of the CMP process.

As defined herein, "low-k dielectric material" corresponds to any material used as a dielectric material in a layered microelectronic device, wherein the material has a dielectric constant less than about 3.5. Preferably, the low-k dielectric materials include low-polarity materials such as silicon-containing organic polymers, silicon-containing hybrid organic/inorganic materials, organosilicate glass (OSG), TEOS, fluorinated silicate glass (FSG), silicon dioxide, and carbon-doped oxide (CDO) glass. It is to be appreciated that the low-k dielectric materials may have varying densities and varying porosities.

As defined herein, "complexing agent" includes those compounds that are understood by one skilled in the art to be complexing agents, chelating agents and/or sequestering agents. Complexing agents will chemically combine with or physically hold the metal atom and/or metal ion to be removed using the compositions described herein.

As defined herein, the term "barrier material" corresponds to any material used in the art to seal the metal lines, e.g., copper interconnects, to minimize the diffusion of said metal, e.g., copper, into the dielectric material. Preferred barrier layer materials include tantalum, titanium, ruthenium, hafnium, tungsten, and other refractory metals and their nitrides and silicides.

As defined herein, "post-etch residue" corresponds to material remaining following gas-phase plasma etching processes, e.g., BEOL dual damascene processing, or wet etching processes. The post-etch residue may be organic, organometallic, organosilicic, or inorganic in nature, for example, silicon-containing material, carbon-based organic material, and etch gas residue such as oxygen and fluorine.

As defined herein, "post-ash residue," as used herein, corresponds to material remaining following oxidative or reductive plasma ashing to remove hardened photoresist and/or bottom anti-reflective coating (BARC) materials. The post-ash residue may be organic, organometallic, organosilicic, or inorganic in nature.

"Substantially devoid" is defined herein as less than 2 wt. %, preferably less than 1 wt. %, more preferably less than 0.5 wt. %, and most preferably less than 0.1 wt. %.

As used herein, "about" is intended to correspond to ±5% of the stated value.

As used herein, "suitability" for cleaning residue and contaminants from a microelectronic device having said residue and contaminants thereon corresponds to at least partial removal of said residue/contaminants from the microelectronic device. Cleaning efficacy is rated by the reduction of objects on the microelectronic device. For example, pre- and post-cleaning analysis may be carried out using an atomic force microscope. The particles on the sample may be registered as a range of pixels. A histogram (e.g., a Sigma Scan Pro) may be applied to filter the pixels in a certain intensity, e.g., 231-235, and the number of particles counted. The particle reduction may be calculated using:

$$\text{Cleaning Efficacy} = \frac{(\text{Number of PreClean Objects} - \text{Number of PostClean Objects})}{\text{Number of PreClean Objects}} \times 100$$

Notably, the method of determination of cleaning efficacy is provided for example only and is not intended to be limited to same. Alternatively, the cleaning efficacy may be considered as a percentage of the total surface that is covered by particulate matter. For example, AFM's may be programmed to perform a z-plane scan to identify topographic areas of interest above a certain height threshold and then calculate the area of the total surface covered by said areas of interest. One skilled in the art would readily understand that the less area covered by said areas of interest post-cleaning, the more efficacious the cleaning composition. Preferably, at least 75% of the residue/contaminants are removed from the microelectronic device using the compositions described herein, more preferably at least 90%, even more preferably at least 95%, and most preferably at least 99% of the residue/contaminants are removed.

The cleaning compositions described herein must possess good metal compatibility, e.g., a low etch rate on the interconnect metal and/or interconnector metal silicide material. Metals of interest include, but are not limited to, copper, tungsten, cobalt, aluminum, tantalum, titanium, ruthenium, and silicides thereof.

Compositions described herein may be embodied in a wide variety of specific formulations, as hereinafter more fully described.

In all such compositions, wherein specific components of the composition are discussed in reference to weight percentage ranges including a zero lower limit, it will be understood that such components may be present or absent in various specific embodiments of the composition, and that in instances where such components are present, they may be present at concentrations as low as 0.001 weight percent, based on the total weight of the composition in which such components are employed.

The cleaning compositions include at least one antioxidant component (i.e., "corrosion inhibitor") where the antioxidant component is added to the cleaning composition to lower the corrosion rate of metals, e.g., copper, aluminum, as well as enhance the cleaning performance. Antioxidants (also referred to as "corrosion inhibitors" herein) contemplated include, but are not limited to: cyanuric acid; barbituric acid and derivatives such as 1,2-dimethylbarbituric acid; glucuronic acid; squaric acid; alpha-keto acids such as pyruvic acid; adenosine and derivatives thereof; purine compounds such as adenine, purine, guanine, hypoxanthine, xanthine, theobromine, caffeine, uric acid, and isoguanine, and derivatives thereof; phosphonic acid and derivatives thereof; phenanthroline/ascorbic acid; glycine/ascorbic acid; nicotinamide and derivatives thereof such as nicotinamide ascorbate; flavonoids such as flavonols and anthocyanins and derivatives thereof; flavonol/anthocyanin; and combinations thereof. For example, the flavonols may include quercitin and derivatives thereof such as quercetin glucosides, quercitrin (quercetinrhamnoside) and rutin (quercetin rutinoside). The combination of anthocyanins and flavonols increases the solubility of flavonols in water. Particularly preferred antioxidants include purine compounds, squaric acid, adenosine and derivatives thereof, phenanthroline/ascorbic acid, nicotinamide and derivatives thereof, flavonoids, anthocyanins, flavonol/anthocyanins, quercitin and derivatives thereof, and glucuronic acid.

In one aspect, a cleaning composition is described, wherein said cleaning composition comprises at least one solvent and at least one antioxidant (i.e., corrosion inhibitor) selected from the group consisting of cyanuric acid; barbituric acid and derivatives such as 1,2-dimethylbarbituric acid; glucuronic acid; squaric acid; alpha-keto acids such as pyruvic acid; adenosine and derivatives thereof; purine compounds such as adenine, purine, guanine, hypoxanthine, xanthine, theobromine, caffeine, uric acid, and isoguanine, and derivatives thereof; phosphonic acid and derivatives thereof; phenanthroline/ascorbic acid; glycine/ascorbic acid; nicotinamide and derivatives thereof such as nicotinamide ascorbate; flavonoids such as flavonols and anthocyanins and derivatives thereof; flavonol/anthocyanin; and combinations thereof. Preferably the solvent comprises water, preferably deionized water.

Embodiments of the cleaning compositions of this aspect include compositions selected from the group consisting of (i)-(ix), wherein the antioxidant (i.e., corrosion inhibitor) is selected from the group consisting of cyanuric acid; barbituric acid and derivatives such as 1,2-dimethylbarbituric acid; glucuronic acid; squaric acid; alpha-keto acids such as pyruvic acid; adenosine and derivatives thereof; purine compounds such as adenine, purine, guanine, hypoxanthine, xanthine, theobromine, caffeine, uric acid, and isoguanine, and derivatives thereof; phosphonic acid and derivatives thereof; phenanthroline/ascorbic acid; glycine/ascorbic acid; nicotinamide and derivatives thereof such as nicotinamide ascorbate; flavonoids such as flavonols and anthocyanins and derivatives thereof; flavonol/anthocyanin; and combinations thereof, (i) a composition comprising at least one quaternary base, at least one organic amine, at least one antioxidant, water, and optionally at least one reducing agent;
(ii) a composition comprising at least one quaternary base, at least one organic amine, at least one antioxidant, at least one complexing agent, and water;
(iii) a composition comprising at least one amine, at least one antioxidant and water;
(iv) a composition comprising at least one amine, at least one antioxidant, at least one surfactant, water, and optionally at least one reducing agent;
(v) a composition comprising at least one amine, at least one antioxidant, at least one reducing agent, water, optionally at least one surfactant, and optionally at least one quaternary base;
(vi) a composition comprising at least one amine, at least one antioxidant, at least one quaternary base, at least one reducing agent, water, and optionally at least one surfactant;
(vii) a composition comprising at least one quaternary base, at least one amine, uric acid, water, and at least one antioxidant;

(viii) a composition comprising at least one quaternary base, at least one amine, uric acid, at least one alcohol, water, and at least one antioxidant; and (ix) a composition comprising at least one surfactant, at least one dispersing agent, at least one sulfonic-acid containing hydrocarbon, water, and at least one antioxidant;

Particularly preferred antioxidants include purine compounds, squaric acid, adenosine and derivatives thereof, phenanthroline/ascorbic acid, nicotinamide and derivatives thereof, flavonoids, anthocyanins, flavonol/anthocyanins, quercitin and derivatives thereof, and glucuronic acid.

In a particularly preferred embodiment, the cleaning composition comprises at least one quaternary base, at least one organic amine, at least one antioxidant, and water, wherein the antioxidant (i.e., corrosion inhibitor) is selected from the group consisting of cyanuric acid; barbituric acid and derivatives such as 1,2-dimethylbarbituric acid; glucuronic acid; squaric acid; alpha-keto acids such as pyruvic acid; adenosine and derivatives thereof; purine compounds such as adenine, purine, guanine, hypoxanthine, xanthine, theobromine, caffeine, uric acid, and isoguanine, and derivatives thereof; phosphonic acid and derivatives thereof; phenanthroline/ascorbic acid; glycine/ascorbic acid; nicotinamide and derivatives thereof such as nicotinamide ascorbate; flavonoids such as flavonols and anthocyanins and derivatives thereof; flavonol/anthocyanin; and combinations thereof. The cleaning composition may optionally further comprise at least one reducing agent, at least one complexing agent, at least one surfactant, residue material, or combinations thereof.

The cleaning composition is particularly useful for cleaning residue and contaminants, e.g., post-CMP residue, post-etch residue, post-ash residue, and contaminants from a microelectronic device structure. Regardless of the embodiment, the cleaning compositions are preferably substantially devoid of oxidizing agent, fluoride source, and abrasive material prior to removal of residue material from the microelectronic device. When the cleaning composition includes glucoronic acid, the pH of the composition should be greater than or equal to 6.

The pH of the cleaning compositions of this aspect may be varied to produce a composition optimized for the intended end use. In general, the pH will be basic, e.g., greater than about 8.5 and less than about 11.5. For example, concentrated cleaning compositions described herein have a higher pH, e.g., about 11 to about 11.5, and following dilution as described herein, the pH of the diluted composition will decrease to about 9 to about 10, respectively. Preferably, diluted cleaning compositions have pH in a range from about 8.5 to 9.5.

In yet another preferred embodiment, the cleaning compositions of this aspect further include residue and/or contaminants. The residue and contaminants may be dissolved and/or suspended in the compositions. Preferably, the residue includes post-CMP residue, post-etch residue, post-ash residue, contaminants, or combinations thereof.

In a further embodiment of this aspect, the cleaning composition may comprise, consist of, or consist essentially of a cleaning composition selected from the group consisting of (i)-(ix), wherein the at least one antioxidant (i.e., corrosion inhibitor) comprises a species selected from the group consisting of cyanuric acid; barbituric acid and derivatives such as 1,2-dimethylbarbituric acid; glucuronic acid; squaric acid; alpha-keto acids such as pyruvic acid; adenosine and derivatives thereof; purine compounds such as adenine, purine, guanine, hypoxanthine, xanthine, theobromine, caffeine, uric acid, and isoguanine, and derivatives thereof; phosphonic acid and derivatives thereof; phenanthroline/ascorbic acid; glycine/ascorbic acid; nicotinamide and derivatives thereof such as nicotinamide ascorbate; flavonoids such as flavonols and anthocyanins and derivatives thereof; flavonol/anthocyanin; and combinations thereof. Particularly preferred antioxidants include purine compounds, squaric acid, adenosine and derivatives thereof, phenanthroline/ascorbic acid, nicotinamide and derivatives thereof, flavonoids; anthocyanins; flavonol/anthocyanins; quercitin and derivatives thereof; and glucuronic acid.

The cleaning compositions may further include additional corrosion inhibitors, in addition to the antioxidants enumerated above, including, but not limited to, ascorbic acid, L(+)-ascorbic acid, isoascorbic acid, ascorbic acid derivatives, benzotriazole, citric acid, ethylenediamine, gallic acid, oxalic acid, tannic acid, ethylenediaminetetraacetic acid (EDTA), uric acid, 1,2,4-triazole (TAZ), tolyltriazole, 5-phenyl-benzotriazole, 5-nitro-benzotriazole, 3-amino-5-mercapto-1,2,4-triazole, 1-amino-1,2,4-triazole, hydroxybenzotriazole, 2-(5-amino-pentyl)-benzotriazole, 1-amino-1,2,3-triazole, 1-amino-5-methyl-1,2,3-triazole, 3-amino-1,2,4-triazole, 3-mercapto-1,2,4-triazole, 3-isopropyl-1,2,4-triazole, 5-phenylthiol-benzotriazole, halo-benzotriazoles (halo=F, Cl, Br or I), naphthotriazole, 2-mercaptobenzimidazole (MBI), 2-mercaptobenzothiazole, 4-methyl-2-phenylimidazole, 2-mercaptothiazoline, 5-aminotetrazole, 5-amino-1,3,4-thiadiazole-2-thiol, 2,4-diamino-6-methyl-1,3,5-triazine, thiazole, triazine, methyltetrazole, 1,3-dimethyl-2-imidazolidinone, 1,5-pentamethylenetetrazole, 1-phenyl-5-mercaptotetrazole, diaminomethyltriazine, imidazoline thione, mercaptobenzimidazole, 4-methyl-4H-1,2,4-triazole-3-thiol, 5-amino-1,3,4-thiadiazole-2-thiol, benzothiazole, tritolyl phosphate, imidazole, indiazole, benzoic acid, ammonium benzoate, catechol, pyrogallol, resorcinol, hydroquinone, cyanuric acid, barbituric acid and derivatives such as 1,2-dimethylbarbituric acid, alpha-keto acids such as pyruvic acid, adenine, purine, phosphonic acid and derivatives thereof, glycine/ascorbic acid, and combinations thereof. For example, the cleaning compositions may include the combination of phenanthroline and ascorbic acid or glycine and ascorbic acid.

Illustrative amines (i.e., organic amines) that may be useful in specific compositions include species having the general formula $NR^1R^2R^3$, wherein $R^1$, $R^2$ and $R^3$ may be the same as or different from one another and are selected from the group consisting of hydrogen, straight-chained or branched $C_1$-$C_6$ alkyl (e.g., methyl, ethyl, propyl, butyl, pentyl, and hexyl) and straight-chained or branched $C_1$-$C_6$ alcohol (e.g., methanol, ethanol, propanol, butanol, pentanol, and hexanol). Most preferably, at least one of $R^1$, $R^2$ and $R^3$ is a straight-chained or branched $C_1$-$C_6$ alcohol. Examples include, without limitation, aminoethylethanolamine, N-methylaminoethanol, aminoethoxyethanol, dimethylaminoethoxyethanol, diethanolamine, N-methyldiethanolamine, monoethanolamine, triethanolamine, 1-amino-2-propanol, 2-amino-1-butanol, isobutanolamine, triethylenediamine, other $C_1$-$C_8$ alkanolamines and combinations thereof.

Quaternary bases contemplated herein include compounds having the formula $NR^1R^2R^3R^4OH$, wherein $R^1$, $R^2$, $R^3$ and $R^4$ may be the same as or different from one another and are selected from the group consisting of hydrogen, straight-chained or branched $C_1$-$C_6$ alkyl (e.g., methyl, ethyl, propyl, butyl, pentyl, and hexyl), and substituted or unsubstituted $C_6$-$C_{10}$ aryl, e.g., benzyl. Tetraalkylammonium hydroxides that are commercially available include tetraethylammonium hydroxide (TEAH), tetramethyammonium hydroxide (TMAH), tetrapropylammonium hydroxide (TPAH), tetrabutylammonium hydroxide (TBAH), tributylmethylammonium hydroxide (TBMAH), benzyltrimethylammonium hydroxide (BTMAH), and combinations thereof, may be used. Tetraalkylammonium hydroxides which are not commercially available may be prepared in a manner analogous to the published synthetic methods used to prepare TMAH, TEAH, TPAH, TBAH, TBMAH, and BTMAH, which are known to one ordinary of skill in the art. Another widely used quaternary ammonium base is choline hydroxide.

Reducing agent(s) contemplated herein include species selected from the group consisting of ascorbic acid, L(+)-ascorbic acid, isoascorbic acid, ascorbic acid derivatives, gallic acid, glyoxal, and combinations thereof.

Illustrative alcohols include straight-chained or branched $C_1$-$C_6$ alcohols (e.g., methanol, ethanol, propanol, butanol, pentanol, and hexanol), diols and triols. Preferably, the alcohol comprises isopropanol (IPA).

Illustrative surfactants for use in the compositions described herein include, but are not limited to, amphoteric salts, cationic surfactants, anionic surfactants, fluoroalkyl surfactants, non-ionic surfactants, and combinations thereof including, but not limited to, SURFONYL® 104, TRITON® CF-21, ZONYL® UR, ZONYL® FSO-100, ZONYL® FSN-100, 3M Fluorad fluorosurfactants (i.e., FC-4430 and FC-4432), dioctylsulfosuccinate salt, 2,3-dimercapto-1-propanesulfonic acid salt, dodecylbenzenesulfonic acid, polyethylene glycols, polypropylene glycols, polyethylene or polypropylene glycol ethers, carboxylic acid salts, $R_1$ benzene sulfonic acids or salts thereof (where the $R_1$ is a straight-chained or branched $C_8$-$C_{18}$ alkyl group), amphiphilic fluoropolymers, polyethylene glycols, polypropylene glycols, polyethylene or polypropylene glycol ethers, carboxylic acid salts, dodecylbenzenesulfonic acid, polyacrylate polymers, dinonylphenyl polyoxyethylene, silicone or modified silicone polymers, acetylenic diols or modified acetylenic diols, alkylammonium or modified alkylammonium salts, as well as combinations comprising at least one of the foregoing surfactants, sodium dodecyl sulfate, zwitterionic surfactants, aerosol-OT (AOT) and fluorinated analogues thereof, alkyl ammonium, perfluoropolyether surfactants, 2-sulfosuccinate salts, phosphate-based surfactants, sulfur-based surfactants, and acetoacetate-based polymers. In a preferred embodiment, the surfactant includes an alkyl benzene sulfonic acid, more preferably dodecylbenzenesulfonic acid.

The dispersing agent, when used in the compositions described herein, is included to increase dispersancy and minimize redeposition of the removed residue and contaminants at the surface of the microelectronic device wafer. Dispersing agents contemplated herein include organic polymers containing acrylic acid or salts thereof having an average molecular weight of less than 15,000, hereinafter referred to as low molecular weight acrylic acid-containing polymer. The low molecular weight acrylic acid-containing polymer has an average molecular weight of less than 15,000, preferably from about 3,000 to about 10,000. The low molecular weight acrylic acid-containing polymer may be either a homopolymer or a copolymer including the essential acrylic acid or acrylic acid salt monomer units. Copolymers may include essentially any suitable other monomer units including modified acrylic, fumaric, maleic, itaconic, aconitic, mesaconic, citraconic, and methylenemalonic acid or their salts, maleic anhydride, alkylene, vinylmethyl ether, styrene and any mixtures thereof. Preferred commercially available low molecular weight acrylic acid containing homopolymers include those sold under the tradename Acusol 445 (Rohm and Haas, Philadelphia, Pa., USA).

The sulfonic acid-containing hydrocarbons contemplated herein include straight chain and branched $C_1$-$C_6$ alkane, e.g., methane, ethane, propane, butane, pentane, hexane, sulfonic acids, straight chain and branched $C_2$-$C_6$ alkene, e.g., ethane, propene, butane, pentene, hexane, sulfonic acids, and substituted or unsubstituted $C_6$-$C_{14}$ aryl sulfonic acids, and salts thereof, e.g., sodium, potassium, etc. Sulfonic acid-containing hydrocarbons include methanesulfonic acid, ethanesulfonic acid, propanesulfonic acid, butanesulfonic acid, pentanesulfonic acid, hexanesulfonic acid, ethenesulfonic acid, toluenesulfonic acid, and combinations thereof.

The optional complexing agents contemplated herein include, but are not limited to, acetic acid, acetone oxime, acrylic acid, adipic acid, alanine, arginine, asparagine, aspartic acid, betaine, dimethyl glyoxime, formic acid, fumaric acid, gluconic acid, glutamic acid, glutamine, glutaric acid, glyceric acid, glycerol, glycolic acid, glyoxylic acid, histidine, iminodiacetic acid, isophthalic acid, itaconic acid, lactic acid, leucine, lysine, maleic acid, maleic anhydride, malic acid, malonic acid, mandelic acid, 2,4-pentanedione, phenylacetic acid, phenylalanine, phthalic acid, proline, propionic acid, pyrocatecol, pyromellitic acid, quinic acid, serine, sorbitol, succinic acid, tartaric acid, terephthalic acid, trimellitic acid, trimesic acid, tyrosine, valine, xylitol, salts and derivatives thereof, and combinations thereof.

With regards to compositional amounts, the weight percent ratios of each component in each embodiment of this aspect described herein is as follows:

- embodiment (i): about 0.1:1 to about 10:1 quaternary base to corrosion inhibitor, preferably about 0.5:1 to about 5:1, and even more preferably about 1:1 to about 2:1; about 0.1:1 to about 10:1 organic amine to corrosion inhibitor, preferably about 0.5:1 to about 5:1, and even more preferably about 2:1 to about 3:1;
- embodiment (ii): about 1:1 to about 5:1 quaternary base to complexing agent, preferably about 2:1 to about 3.5:1; about 1:1 to about 10:1 organic amine to complexing agent, preferably about 3:1 to about 7:1; about 0.001:1 to about 0.5:1 corrosion inhibitor to complexing agent, preferably about 0.01:1 to about 0.1:1;
- embodiment (iii): about 0.1:1 to about 10:1 organic amine to corrosion inhibitor, preferably about 1:1 to about 3:1;
- embodiment (iv): about 0.1:1 to about 10:1 organic amine to corrosion inhibitor, preferably about 1:1 to about 3:1; about 0.001:1 to about 0.5:1 surfactant to corrosion inhibitor, preferably about 0.01:1 to about 0.1:1;
- embodiment (v): about 0.1:1 to about 15:1 organic amine to corrosion inhibitor, preferably about 1:1 to about 10:1; about 0.1 to about 10:1 reducing agent to corrosion inhibitor, preferably about 1:1 to about 8:1;
- embodiment (vi): about 1:1 to about 10:1 organic amine to corrosion inhibitor, preferably about 2:1 to about 7:1; about 0.5:1 to about 8:1 quaternary base to corrosion inhibitor, preferably about 1:1 to about 4:1; about 0.1:1 to about 6:1 reducing agent to corrosion inhibitor, preferably about 0.5:1 to about 3:1; about 0.001:1 to about 0.1:1 surfactant (when present) to corrosion inhibitor;
- embodiment (vii): about 1:1 to about 10:1 amine to corrosion inhibitor, preferably about 2:1 to about 7:1; about 0.5:1 to about 8:1 quaternary base to corrosion inhibitor, preferably about 1:1 to about 4:1; about 0.1:1 to about 6:1 reducing agent to corrosion inhibitor, preferably about 0.5:1 to about 3:1;

embodiment (viii): about 1:1 to about 10:1 amine to corrosion inhibitor, preferably about 2:1 to about 7:1; about 0.5:1 to about 8:1 quaternary base to corrosion inhibitor, preferably about 1:1 to about 4:1; about 0.1:1 to about 6:1 uric acid to corrosion inhibitor, preferably about 0.5:1 to about 3:1; about 0.5:1 to about 8:1 alcohol to corrosion inhibitor, preferably about 1:1 to about 4:1;

embodiment (ix): about 10:1 to about 100:1 corrosion inhibitor to surfactant, preferably about 30:1 to about 70:1; about 0.01:1 to about 5:1 dispersing agent to surfactant, preferably about 0.05:1 to about 1:1; about 1:1 to about 10:1 sulfonic acid-containing hydrocarbon to surfactant, preferably about 3:1 to about 7:1.

In another aspect, the cleaning compositions are aqueous compositions including uric acid and at least one alcohol, which are present in the composition in relative amounts imparting to the composition an effectiveness for cleaning for which the composition is used. In another embodiment, the cleaning compositions are aqueous compositions including at least one amine, at least one base, and uric acid. In another embodiment, the cleaning compositions are aqueous compositions including at least one amine, at least one quaternary base, at least one alcohol, and uric acid. In still another embodiment, the cleaning compositions are aqueous compositions including at least one amine, at least one quaternary base, uric acid, and at least one additional corrosion inhibitor. In yet another embodiment, the cleaning compositions are aqueous compositions including at least one amine, at least one quaternary base, at least one alcohol, uric acid, and at least one additional corrosion inhibitor. As defined herein, "uric acid" also covers derivatives of uric acid.

In the broad practice of this aspect, the cleaning compositions may comprise, consist of, or consist essentially of: (i) at least one amine and at least one alcohol; (ii) at least one amine, at least one base, and uric acid; (iii) at least one amine, at least one quaternary base, at least one alcohol, and uric acid; (iv) at least one amine, at least one quaternary base, uric acid, and at least one additional corrosion inhibitor or (v) at least one amine, at least one quaternary base, at least one alcohol, uric acid, and at least one additional corrosion inhibitor. In general, the specific proportions and amounts of components, in relation to each other, may be suitably varied to provide the desired removal action of the composition for the post-CMP, post-etch and/or post-ash residue and/or processing equipment, as readily determinable within the skill of the art without undue effort. The water is preferably deionized.

The amine(s), base(s), alcohol(s) and additional corrosion inhibitor(s) correspond to those described hereinabove. The range of weight percent ratios of the components of the cleaning composition of this aspect is about 0.3 to about 0.8 quaternary base(s) relative to amine(s), preferably about 0.4 to about 0.7, and most preferably about 0.5 to about 0.6; about 0.3 to about 0.8 alcohol(s) (when present) relative to amine(s), preferably about 0.4 to about 0.7, and most preferably about 0.5 to about 0.6; about 0.01 to about 0.50 uric acid relative to amine(s), preferably about 0.1 to about 0.45, and most preferably about 0.15 to about 0.4; and about 0.01 to about 0.5 additional corrosion inhibitor(s) (when present) relative to amine(s), preferably about 0.1 to about 0.4, and most preferably about 0.2 to about 0.3.

In a specific aspect, the cleaning compositions may be formulated to be substantially devoid of hydrogen peroxide and other oxidizing agents, cyclic ethers, metal corrosion inhibiting metal halides, and abrasive material prior to removal of residue material from the microelectronic device.

The pH of the cleaning compositions of this aspect may be varied to produce a composition optimized for the intended end use. In general, the pH will be basic, e.g., greater than about 8.5 and less than about 11.5. For example, concentrated cleaning compositions described herein have a higher pH, e.g., about 11 to about 11.5, and following dilution as described herein, the pH of the diluted composition will decrease to about 9 to about 10, respectively. Preferably, diluted cleaning compositions have pH in a range from about 8.5 to 9.5.

In various preferred embodiments, concentrates of the cleaning composition of this aspect may have the following weight percent ratios of one component relative to another component:

Concentrate A: wt. % ratio of TMAH relative to 1-amino-2-propanol of 0.56; wt. % ratio of uric acid relative to 1-amino-2-propanol of 0.39; wt. % ratio of IPA relative to 1-amino-2-propanol of 0.56; wt. % ratio of oxalic acid relative to 1-amino-2-propanol of 0.22

Concentrate B: wt. % ratio of TMAH relative to 1-amino-2-propanol of 0.56; wt. % ratio of uric acid relative to 1-amino-2-propanol of 0.056; wt. % ratio of IPA relative to 1-amino-2-propanol of 0.56; wt. % ratio of oxalic acid relative to 1-amino-2-propanol of 0.056

Concentrate C: wt. % ratio of TMAH relative to 1-amino-2-propanol of 0.56; wt. % ratio of uric acid relative to 1-amino-2-propanol of 0.167; wt. % ratio of IPA relative to 1-amino-2-propanol of 0.56; wt. % ratio of oxalic acid relative to 1-amino-2-propanol of 0.22

Concentrates A-C may diluted with water at the manufacturer or at the fab to produce the following Concentrates D-F, wherein all percentages are by weight, based on the total weight of the formulation:

Concentrate D: 5 wt. % TMAH; 9 wt. % 1-amino-2-propanol; 3.5 wt. % uric acid; 5 wt. % IPA; 2 wt. % oxalic acid; 75.5 wt. % water Concentrate E: 5 wt. % TMAH; 9 wt. % 1-amino-2-propanol; 0.5 wt. % uric acid; 5 wt. % IPA; 0.5 wt. % oxalic acid; 80.0 wt. % water Concentrate F: 5 wt. % TMAH; 9 wt. % 1-amino-2-propanol; 1.5 wt. % uric acid; 5 wt. % IPA; 2 wt. % oxalic acid; 77.5 wt. % water Concentrates D-F may be further diluted described herein. For example, Concentrates D-F may be diluted in a ratio of 20:1 diluent to concentrate, as described herein.

The cleaning compositions provide at least one of the following benefits: an alkaline pH to maximize particle repulsion from the surface; solubilization of organic and inorganic residues; surfactant properties and solubility enhancement via the alcohol; and the minimization of corrosion of metal layers in the microelectronic device structure. Furthermore, dielectric material, including low-k dielectric material, on the microelectronic device is not compromised by the cleaning composition. Preferably, the etch rate of metal material is in a range from about 0.01 Å $min^{-1}$ to about 10 Å $min^{-1}$, and most preferably about 0.01 Å $min^{-1}$ to about 5 Å $min^{-1}$.

In a particularly preferred embodiment, the cleaning composition of this aspect is aqueous and comprises, consists of, or consists essentially of TMAH, 1-amino-2-propanol, uric acid, IPA, and oxalic acid.

In another embodiment, the cleaning compositions of this aspect further include post-CMP, post-etch, and/or post-ash residue material. The residue material may be dissolved and/or suspended in the cleaning composition. Accordingly, in another particularly preferred embodiment, the cleaning composition is aqueous and comprises, consists of, or consists essentially of TMAH, 1-amino-2-propanol, uric acid, IPA, oxalic acid, and residue material.

Compositions of both aspects described herein are stable in character and do not degrade in the manner of formulations of the prior art. Thus, the compositions are storage stable, without loss of efficacy, and resistant to oxygen-mediated degradation, so that they may be used in ambient air environments, without loss of effectiveness. Furthermore, because the oxidizable components have relatively good air stability as compared to other antioxidant species, the compositions described herein may be recirculated in batch or single wafer processing tools.

The range of weight percent ratios of the components will cover all possible concentrated or diluted embodiments described herein. Towards that end, in one embodiment, a concentrated cleaning composition is provided that can be diluted for use as a cleaning solution. A concentrated composition, or "concentrate," advantageously permits a user, e.g. CMP process engineer, to dilute the concentrate to the desired strength and pH at the point of use. Dilution of the concentrated cleaning composition may be in a range from about 1:1 to about 2500:1, preferably about 5:1 to about 200:1, wherein the cleaning composition is diluted at or just before the tool with solvent, e.g., deionized water. It is to be appreciated by one skilled in the art that following dilution, the range of weight percent ratios of the components disclosed herein should remain unchanged.

The compositions described herein may have utility in applications including, but not limited to, post-etch residue removal, post-ash residue removal surface preparation, post-plating cleaning and post-CMP residue removal.

The cleaning compositions described herein are easily formulated by simple addition of the respective ingredients and mixing to homogeneous condition. Furthermore, the compositions may be readily formulated as single-package formulations or multi-part formulations that are mixed at or before the point of use, e.g., the individual parts of the multi-part formulation may be mixed at the tool or in a storage tank upstream of the tool. The concentrations of the respective ingredients may be widely varied in specific multiples of the composition, i.e., more dilute or more concentrated, and it will be appreciated that the compositions described herein can variously and alternatively comprise, consist or consist essentially of any combination of ingredients consistent with the disclosure herein.

Accordingly, another aspect relates to a kit including, in one or more containers, one or more components adapted to form the compositions described herein. The kit may include, in one or more containers, at least one corrosion inhibitor, any of the components in the embodiments introduced herein, and optionally at least one additional corrosion inhibitor, for combining with additional solvent, e.g., water, at the fab or the point of use. The containers of the kit must be suitable for storing and shipping said cleaning compositions, for example, NOWPak® containers (Advanced Technology Materials, Inc., Danbury, Conn., USA). The one or more containers which contain the components of the cleaning composition preferably include means for bringing the components in said one or more containers in fluid communication for blending and dispense. For example, referring to the NOWPak® containers, gas pressure may be applied to the outside of a liner in said one or more containers to cause at least a portion of the contents of the liner to be discharged and hence enable fluid communication for blending and dispense. Alternatively, gas pressure may be applied to the head space of a conventional pressurizable container or a pump may be used to enable fluid communication. In addition, the system preferably includes a dispensing port for dispensing the blended cleaning composition to a process tool.

Substantially chemically inert, impurity-free, flexible and resilient polymeric film materials, such as high density polyethylene, are preferably used to fabricate the liners for said one or more containers. Desirable liner materials are processed without requiring co-extrusion or barrier layers, and without any pigments, UV inhibitors, or processing agents that may adversely affect the purity requirements for components to be disposed in the liner. A listing of desirable liner materials include films comprising virgin (additive-free) polyethylene, virgin polytetrafluoroethylene (PTFE), polypropylene, polyurethane, polyvinylidene chloride, polyvinylchloride, polyacetal, polystyrene, polyacrylonitrile, polybutylene, and so on. Preferred thicknesses of such liner materials are in a range from about 5 mils (0.005 inch) to about 30 mils (0.030 inch), as for example a thickness of 20 mils (0.020 inch).

Regarding the containers for the kits, the disclosures of the following patents and patent applications are hereby incorporated herein by reference in their respective entireties: U.S. Pat. No. 7,188,644 entitled "APPARATUS AND METHOD FOR MINIMIZING THE GENERATION OF PARTICLES IN ULTRAPURE LIQUIDS;" U.S. Pat. No. 6,698,619 entitled "RETURNABLE AND REUSABLE, BAG-IN-DRUM FLUID STORAGE AND DISPENSING CONTAINER SYSTEM;" U.S. Patent Application No. 60/916,966 entitled "SYSTEMS AND METHODS FOR MATERIAL BLENDING AND DISTRIBUTION" filed on May 9, 2007 in the name of John E. Q. Hughes, and PCT/US08/63276 entitled "SYSTEMS AND METHODS FOR MATERIAL BLENDING AND DISTRIBUTION" filed on May 9, 2008 in the name of Advanced Technology Materials, Inc.

Proposed kits include, in one container, at least one amine, at least one quaternary base, at least one antioxidant, at least one alcohol (when present), and at least one additional corrosion inhibitor (when present), and optionally water, for combining with the diluent, e.g., water, at the fab or the point of use. In the alternative, the kit may include two containers, one container including the at least one amine, at least one quaternary base, at least one alcohol (when present), and some water, and the other container including at least one antioxidant, at least one additional corrosion inhibitor (when present), and water. In another alternative, the kit may include three containers, one container including the at least one amine, at least one quaternary base, at least one alcohol (when present), and some water, a second container including at least one antioxidant, and water, and a third container including at least one additional corrosion inhibitor and water. In yet another alternative, each component is present in its own container wherein additional water is present in the at least one antioxidant and the at least one additional corrosion inhibitor (when present) containers. Water may optionally be added to the at least one amine, the at least one quaternary base, and the at least one alcohol (when present) containers. In each case, additional water may be added directly to the container system and/or at a subsequent blending/dilution vessel.

As applied to microelectronic manufacturing operations, the cleaning compositions described herein are usefully employed to clean post-CMP residue and/or contaminants from the surface of the microelectronic device. The cleaning compositions do not damage low-k dielectric materials or corrode metal interconnects on the device surface. Preferably the cleaning compositions remove at least 85% of the residue present on the device prior to residue removal, more preferably at least 90%, even more preferably at least 95%, and most preferably at least 99%.

In residue removal application, the composition is applied in any suitable manner to the device to be cleaned, e.g., by spraying the composition on the surface of the device to be cleaned, by dipping (in a volume of the composition) the device to be cleaned, by contacting the device to be cleaned with another material, e.g., a pad, or fibrous sorbent applicator element, that is saturated with the composition, or by any other suitable means, manner or technique by which the composition is brought into removal contact with the device to be cleaned. Further, batch or single wafer processing is contemplated herein. In post-CMP residue and contaminant cleaning application, the cleaning composition may be used with a large variety of conventional cleaning tools such as megasonics and brush scrubbing, including, but not limited to, Verteq single wafer megasonic Goldfinger, OnTrak systems DDS (double-sided scrubbers), SEZ or other single wafer spray rinse, Applied Materials Mirra-Mesa™/Reflexion™/Reflexion LK™, and Megasonic batch wet bench systems.

In use of the compositions described herein for cleaning post-CMP residue, post-etch residue, post-ash residue and/or contaminants from microelectronic devices having same thereon, the cleaning composition typically is contacted with the device for a time of from about 5 sec to about 10 minutes, preferably about 1 sec to 20 min, preferably about 5 sec to about 10 min at temperature in a range of from about 20° C. to about 90° C., preferably about 20° C. to about 50° C. Such contacting times and temperatures are illustrative, and any other suitable time and temperature conditions may be employed that are efficacious to at least partially clean the post-CMP residue/contaminants from the device, within the broad practice of the method. "At least partially clean" and "substantial removal" both correspond to at removal of at least 85% of the residue present on the device prior to residue removal, more preferably at least 90%, even more preferably at least 95%, and most preferred at least 99%

Following the achievement of the desired cleaning action, the cleaning composition may be readily removed from the device to which it has previously been applied, as may be desired and efficacious in a given end use application of the compositions described herein. Preferably, the rinse solution includes deionized water. Thereafter, the device may be dried using nitrogen or a spin-dry cycle.

Advantageously, some of the antioxidants introduced herein undergo visible color changes as they are consumed, which provides a way for the user to monitor the efficacy of the cleaning composition bath. Monitoring means include, but are not limited to, visual and spectrophotometric means. As defined herein, an "endpoint" corresponds to a range whereby the cleaning composition is no longer efficiently and productively removing the materials to be removed from the microelectronic device, e.g., post-CMP residue. The endpoint can be the result of many different factors including, but not limited to, a saturated (e.g., loaded) cleaning composition, and/or the exhaustion of one or more components of the cleaning composition.

Accordingly, another aspect includes a method of identifying an endpoint of a cleaning composition, said method comprising:

contacting a microelectronic device having residue thereon with a cleaning composition, wherein the cleaning composition includes at least one antioxidant (i.e., corrosion inhibitor), wherein the antioxidant is in a first state, signifying that the cleaning composition is useful to substantially remove said residue from the microelectronic device; and monitoring the cleaning composition, wherein a transition of the antioxidant to a second state signifies an endpoint of the cleaning composition.

It is to be appreciated by one skilled in the art that the first state of the antioxidant may be colorless or a first color in the visible spectrum, the second state of the of the antioxidant may be colorless or a second color in the visible spectrum, and the first state and the second state are not the same.

Yet another aspect relates to the improved microelectronic devices made according to the methods described herein and to products containing such microelectronic devices.

Another aspect relates to a recycled cleaning composition, wherein the cleaning composition may be recycled until residue and/or contaminant loading reaches the maximum amount the cleaning composition may accommodate, as readily determined by one skilled in the art.

A still further aspect relates to methods of manufacturing an article comprising a microelectronic device, said method comprising contacting the microelectronic device with a cleaning composition for sufficient time to clean post-CMP residue and contaminants from the microelectronic device having said residue and contaminants thereon, and incorporating said microelectronic device into said article, using a cleaning composition described herein.

In still another aspect, a method of cleaning semiconductor tool parts is described, said method comprising contacting said tool parts with a composition for sufficient time to clean said parts, wherein the composition includes at least one amine, at least one quaternary base, at least one antioxidant, optionally at least one alcohol, and optionally at least one additional corrosion inhibitor. In cleaning application, the composition is applied in any suitable manner to the tool part to be cleaned, e.g., by spraying the composition on the surface of the tool part to be cleaned, by dipping (in a volume of the composition) the tool part to be cleaned, by contacting the tool part to be cleaned with another material, e.g., a pad, or fibrous sorbent applicator element, that is saturated with the composition, or by any other suitable means, manner or technique by which the composition is brought into removal contact with the tool part to be cleaned. Typically, tool parts include many of the same residual and particulate material that is to be removed from the microelectronic device, e.g., post-CMP residue and contaminants, post-etch residue, post-ash residue, and combinations thereof.

The features and advantages are more fully shown by the illustrative examples discussed below.

Example 1

Blanketed PVD copper wafers were immersed in solutions including a basic solution comprising TMAH, 1-amino-2-propanol, and different antioxidants and the corrosion rate of copper determined using a potentiostat where the PVD Cu is the working electrode, Pt mesh is the counter electrode, and an Ag/AgCl electrode is the reference electrode. The copper anodic corrosion rates were calculated at anodic voltage biases from 0.1 to 1.0 V versus open circuit potentials. The results are summarized in Table 1 below.

| Antioxidant | Solution | Corrosion rate/Å $min^{-1}$ |
|---|---|---|
| Control (TMAH + 1-amino-2-propanol) | | 12.28<br>15.03 |
| Ascorbic acid | 12 mL of 3500 ppm ascorbic acid in 200 g basic solution | 2.72 |
| | 18 mL of 3500 ppm ascorbic acid in 200 g basic solution | 2.62 |
| | 24 mL of 3500 ppm ascorbic acid in 200 g basic solution | 2.99 |
| uric acid | 22 mL of 3500 ppm uric acid in 300 g basic solution | 17.47 |
| | 22 mL of 3500 ppm uric acid in 300 g basic solution | 13.43 |
| | 25 mL of 35000 ppm uric acid in 300 g basic solution | 7.57 |
| Uric acid + oxalic acid | 25 mL of 35000 ppm uric (2% oxalic in 300 g basic solution) | 6.94 |
| | 25 mL of 35000 ppm uric (2% oxalic in 300 g basic solution) | 6.18 |
| succinic acid | 25 mL of 3500 ppm succinic acid in 300 g basic solution | 15.05 |
| | 25 mL of 3500 ppm succinic acid in 300 g basic solution | 20.49 |
| adenosine | 800 ppm adenosine in the basic solution | 2.36 |
| | 800 ppm adenosine in the basic solution | 2.40 |
| | 800 ppm adenosine + 800 ppm ascorbic acid in the basic solution | 3.18 |
| butylated hydroxytoluene | 3.38 wt. % in the basic solution | 14.40 |
| methylene diphosphonic acid | 3.62 wt. % in the basic solution | 16.80 |
| 2-amino-ethyl-phosphonic acid | 2.6 wt. % in the basic solution | 21.50 |

It can be seen that adenosine significantly reduced the corrosion rate of copper. Additional advantages include, but are not limited to, minimization of copper roughness and the stabilization of the copper (I) oxide surface subsequent to residue removal.

Example 2

Compositions were employed for post-CMP cleaning of Sematech 854 pattern wafers having dried slurry and other PCMP residues on their surface. The wafer in each instance was cleaned on a Laurell Technologies Corporation (North Wales, Pa., USA) single wafer spin processor at 23° C. for 90 sec at 150 rpm using diluted removal concentrates A or D (concentrate D includes 5 wt. % TMAH; 9 wt. % 1-amino-2-propanol; 3.5 wt. % uric acid; 5 wt. % IPA; and 77.5 wt. % water), 30 sec at 150 rpm using deionized water, and 30 sec at 2500 rpm to spin dry the wafer. The cleaning compositions used were diluted 20 parts diluent (water) to 1 part removal concentrate prior to wafer processing.

Following treatment, each wafer was subjected to atomic force microscopic (AFM) imaging (Digital Instruments Dimension 5000 Scanning Probe Microscope, Woodbury, N.Y., USA) to evaluate surface roughening. For each wafer sample, three random copper pads located towards the center of the wafer piece were selected for AFM analysis. At each copper pad location, a 20 μm×20 μm region was scanned in tapping mode at a pixel density of 512×512 and a scan rate of 1.0 Hz.

The AFM images provide two RMS surface roughness measurements—one with the slurry particles which is indicate of the slurry contamination (Full Image) and one that excludes slurry particles and thus is indicative of the copper surface roughness (Partial Image).

Figure 1B:
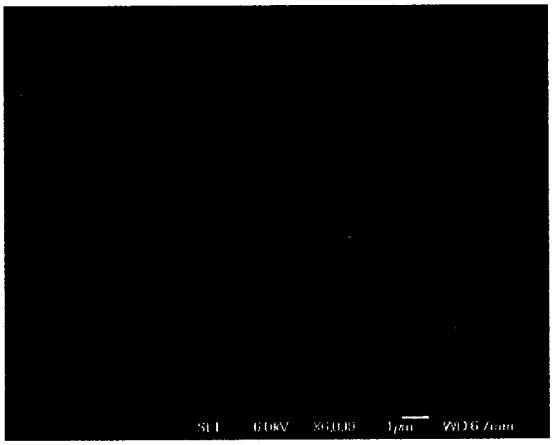
FIG. 1b is a SEM of the control wafer of FIG. 1a following cleaning with a 20:1 dilution of concentrate A according to the method described herein.
Figure 1C:
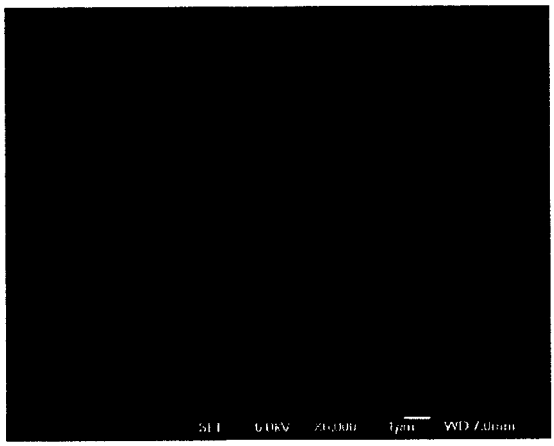
FIG. 1c is a SEM of the control wafer of FIG. 1a following cleaning with a 20:1 dilution of concentrate D according to the method described herein.

Referring to FIGS. 1a, 1b, and 1c, which are scanning electron micrographs (SEM) at 6,000 times magnification of the control wafer, the wafer cleaned with formulation A, and the wafer cleaned with formulation D, respectively, it can be seen that the wafer following cleaning with diluted concentrate A and the wafer following cleaning with diluted concentrate D shows little difference. The post-CMP residue was substantially removed in both cases.

Figure 2A:
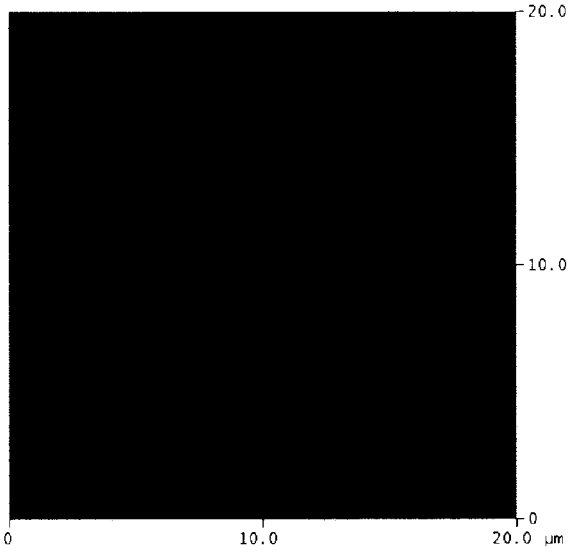
FIG. 2a is a Partial Image atomic force micrograph (AFM) of the copper surface following cleaning with a 20:1 dilution of concentrate A according to the method described herein.
Figure 2B:
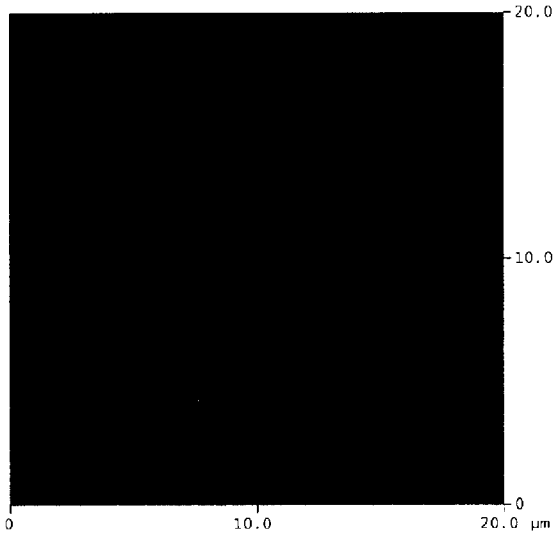
FIG. 2b is a Partial Image atomic force micrograph (AFM) of the copper surface following cleaning with a 20:1 dilution of concentrate D according to the method described herein.

The AFM micrographs shown in FIGS. 2a and 2b, corresponding to the Partial Image of the wafer following cleaning with diluted concentrate A and diluted concentrate D, respectively, reveal that the addition of the second organic acid antioxidant compound (FIG. 3a—RMS roughness=0.443) provides the benefit of decreased copper surface roughening as compared to the formula without the second organic acid antioxidant compound (FIG. 3b—RMS roughness=0.778).

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art, based on the disclosure herein. The invention therefore is to be broadly construed, as encompassing all such variations, modifications and alternative embodiments within the spirit and scope of the claims hereafter set forth.

What is claimed is:

1. A method of removing post-chemical mechanical polishing (CMP) residue from a microelectronic device having said post-CMP residue thereon, said method comprising contacting the microelectronic device with a cleaning composition for sufficient time to at least partially clean said post-CMP residue from the microelectronic device, wherein the cleaning composition [includes at least one solvent] *consists of water*, at least one corrosion inhibitor, *at least one quaternary base*, and at least one amine, wherein the *at least one* corrosion inhibitor [comprises a species] *is* selected from the group consisting of [barbituric acid and derivatives thereof,] glucuronic acid, squaric acid, [alpha-keto acids,] adenosine and derivatives thereof, [guanine, hypoxanthine, xanthine, theobromine, caffeine, isoguanine, phenanthroline/ascorbic acid, nicotinamide and derivatives thereof,] flavonols and derivatives thereof, anthocyanins and derivatives thereof, [flavonol/anthocyanin,] and combinations thereof,

*wherein the at least one amine is selected from the group consisting of aminoethylethanolamine, N-methylaminoethanol, aminoethoxyethanol, dimethylaminoethoxyethanol, diethanolamine, N-methyldiethanolamine, monoethanolamine, triethanolamine, 1-amino-2-propanol, 2-amino-1-butanol, isobutanolamine, triethylenediamine, other* $C_1$-$C_8$ *alkanolamines and combinations thereof, and*

*wherein the at least one quaternary base is selected from the group consisting of tetraethylammonium hydroxide (TEAH), tetramethyammonium hydroxide (TMAH), tetrapropylammonium hydroxide (TPAH), tetrabutylammonium hydroxide (TBAH), tributylmethylammonium hydroxide (TBMAH), benzyltrimethylammonium hydroxide (BTMAH), and combinations thereof.*

[2. The method of claim 1, wherein the cleaning composition further comprises at least one quaternary base.]

3. The method of claim 1, wherein said contacting comprises conditions selected from the group consisting of: time of from about 1 second to about 20 minutes; temperature in a range of from about 20° C. to about 90° C.; and combinations thereof.

4. The method of claim 1, wherein the microelectronic device comprises an article selected from the group consisting of semiconductor substrates, flat panel displays, phase change memory devices, solar panels [and other products including], solar substrates, photovoltaics, and microelectromechanical systems (MEMS).

5. The method of claim 1, further comprising diluting the cleaning composition with diluent at or before a point of use, wherein the composition is diluted in a range from about 5:1 to about 200:1.

6. The method of claim [4] *5*, wherein said diluent comprises water.

7. The method of claim 1, further comprising rinsing the microelectronic device with deionized water following contact with the cleaning composition.

[8. The method of claim 1, wherein the cleaning composition further comprises at least one additional component selected from the group consisting of: at least one quaternary base; at least one complexing agent; at least one surfactant; at least one reducing agent; at least one dispersing agent; at least one sulfonic acid-containing hydrocarbon; at least one alcohol; and combinations thereof.]

[9. The method of claim 1, wherein the cleaning composition further comprises at least one embodiment (i) through (viii):

(i) at least one quaternary base, and optionally at least one reducing agent;

(ii) at least one quaternary base, and at least one complexing agent;

(iii) at least one surfactant, and optionally at least one reducing agent;

(iv) at least one reducing agent, optionally at least one surfactant, and optionally at least one quaternary base;

(v) at least one quaternary base, at least one reducing agent, and optionally at least one surfactant;

(vi) at least one quaternary base and uric acid;

(vii) at least one quaternary base, uric acid, and at least one alcohol; and (viii) at least one quaternary base and at least one alcohol.]

[10. The method of claim 1, wherein the solvent comprises water.]

11. The method of claim 1, wherein the pH of the cleaning composition is in a range from about 8.5 to about 11.5.

[12. The method of claim 1, wherein the cleaning composition is substantially devoid of oxidizing agent, fluoride source, and/or abrasive material prior to removal of residue material from the microelectronic device.]

[13. The method of claim 1, wherein the cleaning composition further comprises at least one additional corrosion inhibitor, wherein the at least one additional corrosion inhibitor comprises a species selected from the group consisting of ascorbic acid, L(+)-ascorbic acid, isoascorbic acid, ascorbic acid derivatives, benzotriazole, citric acid, ethylenediamine, gallic acid, oxalic acid, tannic acid, ethylenediaminetetraacetic acid (EDTA), uric acid, 1,2,4-triazole (TAZ), tolyltriazole, 5-phenyl-benzotriazole, 5-nitro-benzotriazole, 3-amino-5-mercapto-1,2,4-triazole, 1-amino-1,2,4-triazole, hydroxybenzotriazole, 2-(5-amino-pentyl)-benzotriazole, 1-amino-1,2,3-triazole, 1-amino-5-methyl-1,2,3-triazole, 3-amino-1,2,4-triazole, 3-mercapto-1,2,4-triazole, 3-isopropyl-1,2,4-triazole, 5-phenylthiol-benzotriazole, halo-benzotriazoles (halo=F, Cl, Br or I), naphthotriazole, 2-mercaptobenzimidazole (MBI), 2-mercaptobenzothiazole, 4-methyl-2-phenylimidazole, 2-mercaptothiazoline, 5-aminotetrazole, 5-amino-1,3,4-thiadiazole-2-thiol, 2,4-diamino-6-methyl-1,3,5-triazine, thiazole, triazine, methyltetrazole, 1,3-dimethyl-2-imidazolidinone, 1,5-pentamethylenetetrazole, 1-phenyl-5-mercaptotetrazole, diaminomethyltriazine, imidazoline thione, mercaptobenzimidazole, 4-methyl-4H-1,2,4-triazole-3-thiol, 5-amino-1,3,4-thiadiazole-2-thiol, benzothiazole, tritolyl phosphate, imidazole, indiazole, benzoic acid, ammonium benzoate, catechol, pyrogallol, resorcinol, hydroquinone, cyanuric acid, barbituric acid and derivatives such as 1,2-dimethylbarbituric acid, alpha-keto acids such as pyruvic acid, adenine, purine, phosphonic acid and derivatives thereof, glycine/ascorbic acid, and combinations thereof.]

[14. The method of claim 1, wherein the at least one amine has the general formula $NR^1R^2R^3$, where $R^1$, $R^2$ and $R^3$ may be the same as or different from one another and are selected from the group consisting of hydrogen, straight-chained $C_1$-$C_6$ alkyl, branched $C_1$-$C_6$ alkyl, straight-chained $C_1$-$C_6$ alcohol, and branched $C_1$-$C_6$ alcohol.]

[15. The method of claim 2, wherein the at least one quaternary base has the formula $NR^1R^2R^3R^4OH$, wherein $R^1$, $R^2$, $R^3$ and $R^4$ may be the same as or different from one another and are selected from the group consisting of hydrogen, straight-chained $C_1$-$C_6$ alkyl, branched $C_1$-$C_6$ alkyl, substituted $C_6$-$C_{10}$ aryl, and unsubstituted $C_6$-$C_{10}$ aryl.]

[16. The method of claim 8, comprising at least one alcohol, wherein the at least one alcohol comprises straight-chained or branched $C_1$-$C_6$ alcohols.]

[17. The method of claim 14, wherein the at least one amine comprises a species selected from the group consisting of aminoethyletholamine, N-methylaminoethanol, aminoethoxyethanol, dimethylaminoethoxyethanol, diethanolamine, N-methyldiethanolamine, monoethanolamine, triethanolamine, 1-amino-2-propanol, 2-amino-1-butanol, isobutanolamine, triethylenediamine, other $C_i$-$C_8$ alkanolamines and combinations thereof.]

[18. The method of claim 15, wherein the at least one quaternary base comprises a species selected from the group consisting of tetraethylammonium hydroxide (TEAH), tetramethyammonium hydroxide (TMAH), tetrapropylammonium hydroxide (TPAH), tetrabutylammonium hydroxide (TBAH), tributylmethylammonium hydroxide (TBMAH), benzyltrimethylammonium hydroxide (BTMAH), and combinations thereof.]

19. The method of claim 1, wherein the at least one corrosion inhibitor [comprises] *is selected from the group consisting of* adenosine [and], derivatives thereof, *and combinations thereof.*

* * * * *